United States Patent
Potluri et al.

(10) Patent No.: US 9,828,473 B2
(45) Date of Patent: Nov. 28, 2017

(54) NANOPARTICULATES AND A LINEAR POLYMER DELIVERY SYSTEM

(71) Applicant: ZYVEX PERFORMANCE MATERIALS, INC., Columbus, OH (US)

(72) Inventors: Srinagesh Kumar Potluri, Dublin, OH (US); Weijun Wang, Midland, MI (US); Srinivas Gadthula, Dublin, OH (US); Bao Ngoc Le, Columbus, OH (US)

(73) Assignee: ZYVEX PERFORMANCE MATERIALS, INC., Columbus, OH (US)

( * ) Notice: Subject to any disclaimer, the term of this patent is extended or adjusted under 35 U.S.C. 154(b) by 0 days.

(21) Appl. No.: 14/890,194

(22) PCT Filed: May 9, 2014

(86) PCT No.: PCT/US2014/037504
§ 371 (c)(1),
(2) Date: Nov. 10, 2015

(87) PCT Pub. No.: WO2014/183038
PCT Pub. Date: Nov. 13, 2014

(65) Prior Publication Data
US 2016/0083530 A1     Mar. 24, 2016

Related U.S. Application Data

(60) Provisional application No. 61/822,023, filed on May 10, 2013, provisional application No. 61/924,883, filed on Jan. 8, 2014.

(51) Int. Cl.
| | |
|---|---|
| *C08J 3/22* | (2006.01) |
| *C08G 18/32* | (2006.01) |
| *C08L 63/00* | (2006.01) |
| *C08L 67/00* | (2006.01) |
| *C08L 75/04* | (2006.01) |
| *C08K 3/00* | (2006.01) |
| *C08K 7/00* | (2006.01) |

(52) U.S. Cl.
CPC .......... *C08J 3/226* (2013.01); *C08G 18/3206* (2013.01); *C08J 3/22* (2013.01); *C08K 3/00* (2013.01); *C08K 7/00* (2013.01); *C08L 63/00* (2013.01); *C08L 67/00* (2013.01); *C08L 75/04* (2013.01); *C08J 2363/00* (2013.01); *C08J 2367/02* (2013.01); *C08J 2375/04* (2013.01); *C08J 2463/00* (2013.01); *C08J 2463/02* (2013.01); *C08J 2467/02* (2013.01); *C08J 2475/04* (2013.01); *C08K 2201/011* (2013.01)

(58) Field of Classification Search
CPC .................................. C08J 3/226; C08K 3/04
USPC ........ 523/351, 400, 468; 524/495, 496, 590, 524/604
See application file for complete search history.

(56) References Cited

U.S. PATENT DOCUMENTS

| | | |
|---|---|---|
| 5,039,465 A | 8/1991 | Freeman et al. |
| 7,547,472 B2 | 6/2009 | Chen et al. |
| 7,601,421 B2 | 10/2009 | Khabashesku et al. |
| 7,928,156 B2 | 4/2011 | Berzinis |
| 8,048,341 B2 | 11/2011 | Burton et al. |
| 2009/0326134 A1 | 12/2009 | Berzinis |
| 2012/0071586 A1 | 3/2012 | Thunhorst et al. |

FOREIGN PATENT DOCUMENTS

| | | |
|---|---|---|
| WO | 2012/126391 | 9/2012 |
| WO | WO 2013/169960 A2 | 11/2013 |

OTHER PUBLICATIONS

PCT, International Search Report and Written Opinion, Int'l Appln. No. PCT/US2014/037504 (dated Dec. 9, 2014).
Pascault et al., *Epoxy Polymers*, p. 150, John Wiley & Sons (2009).
Chen et al., "Carbon Nanotube-Induced Planarization of Conjugated Polymers in Solution," *Mater. Res. Soc. Symp. Proc.*, vol. 858E, pp. HH12.4.1-HH12.4.6 (2005).
European Search Report, International Application No. PCT/US2014/037504; dated Dec. 21, 2016, 7 pages.

*Primary Examiner* — Edward Cain
(74) *Attorney, Agent, or Firm* — Thompson Hine LLP

(57) ABSTRACT

Methods and compositions are provided for the efficient and beneficial use of nanoparticulates, such as carbon nanotubes. In various embodiments, a nanoparticulate entrapped in a linear polymer, where the linear polymer is formed in the presence of the nanoparticulate, is provided. The entrapped nanoparticulate provides an efficient means to introduce nanoparticulates into compositions, such as resins and fiber-reinforced resins, allowing for increased dispersion and beneficial properties.

16 Claims, No Drawings

NANOPARTICULATES AND A LINEAR POLYMER DELIVERY SYSTEM

Nanoparticles or particulates such as CNTs (Carbon Nanotube), Nano Graphene Platelets (NGP), nanohorns, and Nanoclays (NC) due to their high-aspect ratio, lightweight, high mechanical strength, high electrical and thermal conductivity, and unique optoelectronic properties, have been termed by experts as the "material of the 21st century". These properties have fueled many potentially important applications for these materials. However, fundamental research on these nano-materials focuses on the intrinsic properties of individual particulates. Due to their high polarizability and strong van der Waals interactions between one another, it has proven difficult to realize the potential of these materials. The lack of processability and the difficult manipulation in any host matrix have imposed great limitations on the use of the nanoparticulates in various applications. In addition, their poor solubility in organic solvents and aqueous solutions is a considerable challenge for their manipulation, separation and assembly, which, in fact, are key factors in many applications. Carbon nanoparticulates such as CNTs and NGP have a potential to impart multi functionality by simultaneously improving mechanical and electrical properties of polymer composites. CNTs and NGP impart electrical conductivities to the composites by creating percolation network. The current state of art, because of poor dispersion, requires CNT and/or NGP loadings higher than 2.0% to achieve an effective percolation network. However, at high CNT an/or NGP loadings, mechanical properties are adversely affected, because the agglomerated CNTs/and/or NGP create stress concentration points where the composites prematurely fail. Hence both from commercial and technical viability there is a need to improve the dispersion quality of nanoparticulates to achieve multi-functionality in the composites.

The current methods for introducing nanoparticulates into polymer resins for fabricating fiber reinforced composites using prepregs (pre-impregnated fiber reinforcements), pultrusion, filament winding, sheet molding compounding (SMC), bulk molding compound (BMC) and compression molding involve elaborate mixing procedures. The majority of the composite manufacturing processes involve impregnation of fiber tows with the resins by drawing the fiber tows through a resin bath. During the impregnation process, nanoparticulates have adverse interactions with the fibers because of a large difference in the surface energies. As a result, nanoparticulates are not uniformly distributed in the resultant composite structure. In addition, nanoparticulate filled resins are not compatible with typical composite fabrication techniques such as Vacuum Infusion (VI) processes commonly used in making the fiber-reinforced plastics (FRPs).

To overcome the traditional processing difficulties and with a goal of efficiently delivering nanoparticulates, such as CNTs, NGP, and nanoclays, and others into composites, the present invention discloses efficient delivery of nanoparticulates into compositions, such as fiber reinforced polymer composites, using linear polymers made from thermoset resins loaded with well-dispersed nanoparticulates, referred to as Nanoparticulate Linear Polymer Delivery System (LPDS).

To enable preparation of nanoparticulate reinforced compositions, such as composites, a large-scale effort has been invested into the development of an efficient surface treatment and functionalization technique for improving the dispersion and interfacial interaction of nanoparticulate with various matrices. Both functionalized and un-functionalized nanoparticulates have been uniformly distributed into polymer matrices. Despite the good dispersions in the resins, very modest improvement in the mechanical properties of the fiber-reinforced plastics (FRP) has been observed. The weak interactions between the nanoparticulates and the resin matrix are the cause for modest improvement in mechanical properties.

In order to improve the interface between nanoparticulates and resin matrix, the current invention discloses a method for making new linear polymers derived from resins, such as thermoset resins, with entrapped nanoparticulates, such as CNTs and NGPs and Nanoclay. The linear polymer not only creates a physical barrier preventing re-agglomeration or re-aggregation of the nanomaterial, but also aids delivery of the nanoparticulates into compositions, such as fiber reinforced polymer composites.

In one embodiment, the procedure for creating linear polymer involves, initiating polymerization of liquid thermoset resin such as epoxy, polyester, polyurethane, epoxy vinyl ester with corresponding curing agents. Prior to the polymerization, the nanoparticulates are uniformly dispersed into the thermoset resin precursors. In various embodiments, the nanoparticulates are pre-dispersed into the thermoset precursor by high shear mixing, media milling, three role milling or a combination of the processes. In certain implementations, the linear polymer stabilized-nanoparticles function as master batches that can be introduced into other thermoset and thermoplastic resins. In one embodiment, the linear polymer comprises at least one functional group that facilitates bonding or interaction between the nanoparticle and the resin.

In various embodiments, curing agents are chosen which encourage formation of linear polymer and discourage cross-linking between the polymeric chains. Linear polymers are more readily soluble, and therefore, enhances the dispersion of the nanoparticulate in association with the linear polymer in a subsequent compositions and/or resins. For example, depending on the type of linear polymer to be formed, the following reactants tend to favor formation of a linear polymer: cyclohexylamine, cyclopentylamine, 2-amino-2-methyl-1,3-propanedio, (±)-3-amino-1,2-propanediol, 2-amino-2-methyl-1-propanol, variously substituted anilines, 3-aminopropyltrimethoxysilane, isopropylamine, etc. With step growth polymerization, the reaction can be terminated by a variety of methods not limited to: 1) Adding a monofunctional species containing the same functionality as one or more of the types of monomer used in the reaction, 2) A multifunctional species in which only one functionality reacts with the growing polymer chain and, 3) Adding lower stoichiometry of one of the species used in the creation of linear polymer, and a combination thereof. For example, an alcohol R'—OH can be used to stop a reaction between a polyisocyanate and a polyol because it will react with the isocyanate functionality R—N=C=O to produce R—(N—H)—(C=O)—O—R' which is then no longer reactive with the polyol. In this way, by incorporating an amount of mono-functional species into the linear polymer polymerization reaction, formation of linear polymers is favored, and formation of branched polymers is disfavored. The linear polymers can be designed to function as plasticizers or as reactive species. In the absence of reactive functionalities the linear polymer will function as a plasticizer. On the other hand, having reactive functional groups will aid the linear polymer to chemically bond into the polymer matrix and/or into the FRP composites. Reactive groups can be incorporated into the linear polymer by the use of appropriate reactants containing two or more chemically distinct functionalities. During the step growth process, one of the two or more functionalities reacts to form the linear polymer. The other unreactive functionalities remain intact during the process of making linear polymer. However, during the cure process, the unreactive groups are designed to react with the bulk polymer matrix into which the linear polymer is let down. Cross-linking of the linear polymer with the bulk polymer matrix help in locking the nanoparticulates into FRP composites.

The reaction conditions are chosen to create the linear polymer with an optimum molecular weight given the desired downstream application. For example, in one embodiment, the molecular weight of an epoxy polymer is between about 2000 and about 40,000, where higher molecular weight often results in insoluble material, and lower molecular weight often results in unstable dispersions. Determination of an optimal molecular weight is readily determined by a person having ordinary skill in the art, and depends on the resin system employed, and the requirements and/or applications for the subsequently formed composition.

The linear polymer with entrapped nanoparticulates processes increased solubility in solvents and other resins. In general, the linear polymers function as nanoparticulate carriers, and facilitate their distribution into other compatible thermoset and thermoplastic resins. By compatible, it is understood in the art that where the chemical structure of the linear polymer is similar to that of the thermoset or thermoplastic, the linear polymer is considered compatible with the thermoset or thermoplastic resin. For example, a linear polymer created from epoxy resin monomers will be compatible with the epoxy resin, polyester and vinyl ester. Likewise, a linear polymer created from polyester resin monomers will be compatible with polyester resin, vinyl ester and epoxy. Compatibility will decrease the phase separation of the linear polymer-nanoparticulate and the resin matrix. Furthermore, linear polymers with high nanoparticulate loadings, i.e., amounts, will also function as master batches that be can be let down, i.e., diluted, into both thermoset and thermoplastic resin compositions.

In various embodiments, polar groups, when present, on the linear polymer will create multiple interfaces among nanoparticulates, resin, and if present, fibers in fiber reinforced polymers (FRPs). For example, groups such as hydroxy, amine, acrylate, ester, phenolic, etc. on a linear polymer may interact with other components of the described compositions, facilitating dispersion of the linear polymer and nanoparticulates. In one embodiment, these interactions stabilize the described nanoparticulate dispersions. Although is not well understood, stabilization of nanoparticulates by linear polymer may be explained by two mechanisms: 1) The linear polymer wraps around a functionalized or un-functionalized nanoparticulate, such as a CNT, and/or NGP 2) Van der Waals forces between the nanoparticulates and the linear polar is stronger than the attraction between the nanoparticulates. In addition, polar groups, when present, on the linear polymer will result in improving the interaction between the fiber reinforcement and the resin. The commercial surface treatments on the fiber reinforcements are generally compatible with resins of lower viscosities and surface tension. It is known that, adding nanoparticulates, such as CNTs, into resins results in both an increase in surface tension and the viscosity. These changes result in decreased wetting of the fiber and thus make the resins containing CNTs incompatible with the fiber reinforcements. The polar groups on the linear polymer helps to change the physical characteristics of the resins and aid in compatibilizing with the commercial fiber treatments.

In various embodiments, nanoparticulates include CNTs, NGP, fullerenes, inorganic nanoparticulates such as NC, or a combination thereof. Furthermore, the nanoparticulates, such as CNTs, are unfunctionalized or functionalized. For example, CNTs have smooth walls with no functional groups. The process of adding functional groups by covalent modifications or by adding polymers that impart functionalities to the CNTs is functionalization. Functionalization can be accomplished either by covalent and/or non-covalent functionalization using surfactants, other polymers, small molecules, or by our previously described methods. For example, covalent side-wall functionalization of CNTs can lead to the dissolution of carbon nanotubes in organic solvents. In one instance, carbon nanotube surfaces are functionalized in a non-wrapping fashion by functional conjugated polymers that include functional groups, such as poly(aryleneethynylene)s and poly(3-decylthiophene), for solubilizing such nanotubes, where "non-wrapping" means not enveloping the diameter of a nanotube. Carbon nanotubes can also be solubilized in organic solvents by polymer wrapping by polymers such as starch and poly vinyl phenyylene, but one disadvantage of this approach is that the polymer is very inefficient in wrapping the small-diameter single-walled carbon nanotubes because of high strain conformation required for the polymer. This is in contrast to the present invention, in which the linear polymer is "grown" in the presence of the nanoparticulate, and therefore, provides much better wrapping.

The following chemical reactions provide examples to illustrate the creation of linear polymers, in the presence of nanoparticulates, from the epoxy, epoxy vinyl ester, polyesters, and polyurethane resins, with the reactions shown below (letter or number designations in parenthesis, refer to corresponding chemical entity).

Epoxy Resin Linear Polymer

Epoxy is both the basic component and the cured end product of epoxy resins, as well as a colloquial name for the epoxide functional group. Epoxy resins are low molecular weight pre-polymers or higher molecular weight polymers which normally contain at least two epoxide groups. The epoxide group is also sometimes referred to as a glycidyl or oxirane group. Epoxy resins, also known as polyepoxides are a class of reactive prepolymers and polymers which contain epoxide groups. As with other classes of thermoset polymer materials, blending different grades of epoxy resin, as well as use of additives, plasticizers or fillers may be used to achieve the desired processing and/or final properties, or to reduce cost. Use of blending, additives and fillers is often referred to as formulating. Various forms of epoxy resins are known, and include bisphenol A epoxy resin, bisphenol F epoxy resin, novolac epoxy resin, aliphatic epoxy resin, such as glycidyl epoxy resins and cycloaliphatic epoxides, and glycidylamine epoxy resin.

Epoxy resins may be reacted either with themselves through catalytic homopolymerisation, or with a wide range of co-reactants, often referred to as hardeners or curatives, and this reaction is commonly referred to as curing. In principle, any molecule containing a reactive hydrogen may react with the epoxide groups of the epoxy resin. Common classes of curatives for epoxy resins include amines, acids (and acid anhydrides), phenols, alcohols and thiols. Primary amines undergo an addition reaction with the epoxide group to form a hydroxyl group and a secondary amine. The secondary amine can further react with an epoxide to form a tertiary amine and an additional hydroxyl group. Use of a difunctional or polyfunctional amine forms a three-dimensional cross-linked network. Aliphatic, cycloaliphatic and aromatic amines are all employed as epoxy hardeners. Amine type will alter both the processing properties (viscosity, reactivity) and the final properties (mechanical, temperature and chemical resistance) of the cured copolymer network.

While some epoxy resin/curative combinations will cure at ambient temperature, many require heat, with temperatures up to 150° C. being common, and up to 200° C. for some systems. Insufficient heat during cure will result in a network with incomplete polymerization, and thus reduced mechanical, chemical and heat resistance. Cure temperature should typically attain the glass transition temperature (Tg) of the fully cured network in order to achieve maximum properties. Temperature is sometimes increased in a stepwise fashion to control the rate of curing and prevent excessive heat build-up from the exothermic reaction. The epoxy curing reaction may be accelerated by addition of small quantities of accelerators. Tertiary amines, carboxylic acids and alcohols (especially phenols) are effective accelerators.

Reaction of polyepoxides with themselves or with curatives forms a thermosetting polymer, often with high mechanical properties, temperature and chemical resistance. Epoxy has a wide range of applications, including metal coatings, use in electronics and electrical components, high tension electrical insulators, fiber-reinforced plastic materials and structural adhesives.

In one embodiment, a method is provided for the formation of epoxy resin linear polymers having a desired molecular weight, made from the reactions between epoxy resins and curing agents, in the presence of nanoparticulates. Nanoparticulates can be loaded into either the epoxy resin or the curing agent, or both. Nanoparticulates are mixed into the resin monomers by mechanical mixing, high shear mixing, ball milling, media milling, and/or ultrasonication.

In one embodiment, the nanoparticulates are added to the epoxy resin (1), where n is 0.8 to 5. In one embodiment, the epoxy resin is selected from the group consisting of bisphenol A and F resins not limited to diglycidyl ether of bisphenol A and F; modified diglycidyl ether of Bisphenol A and F, cycloaliphatic, 1,4-butanediol diglycidyl ether, neopentyl glycol diglycidyl ether, dimer acid diglycidyl ester, and combinations thereof. Modifiers may also be included, and include Heloxy modifiers (3), such as Heloxy 8, Heloxy 61, Heloxy 116, Heloxy 62, Heloxy 65, Heloxy 48, Heloxy 67, Heloxy 68, Heloxy 107, Heloxy 71, Heloxy 505, and Cardura E10P.

In one embodiment, the nanoparticulates are added to the curing agent. In one embodiment, the curing agent is a primary amine, and the nanoparticulates are added to a primary amine, i.e., $R_1-NH_2$(2). In one embodiment, curing agents are selected from the group consisting of cyclohexylamine, cyclopentylamine, 2-amino-2-methyl-1,3-propanediol, (±)-3-amino-1,2-propanediol, 2-amino-2-methyl-1-propanol, aniline, 3-aminopropyltrimethoxysilane, isopropylamine, and combinations thereof. In one embodiment, the curing agent is not limited to amino compounds that favor the formation of linear polymers from epoxy resins, such as primary amines, and include polyether amines, hydroxyl amines, hydroxyl aliphatic amines, hydroxyl aliphatic polyether amine, hydroxy aromatic amines.

In one embodiment, the resultant reaction produces epoxy resin (4), where n is 4 to 10, containing nanoparticulates. In one embodiment, nanoparticulates are present at about 1% to about 50% in wt % in either reactant or resulting polymer. Use of a mono-functional epoxy, e.g., an epoxy resin having only one epoxy group, and appropriate curing agent(s) controls the molecular weights of the linear polymers. In one embodiment, typical molecular weights are in the range of about 2000 to about 40,000, where these molecular weights help in improving the solubility of the linear polymer into other resins.

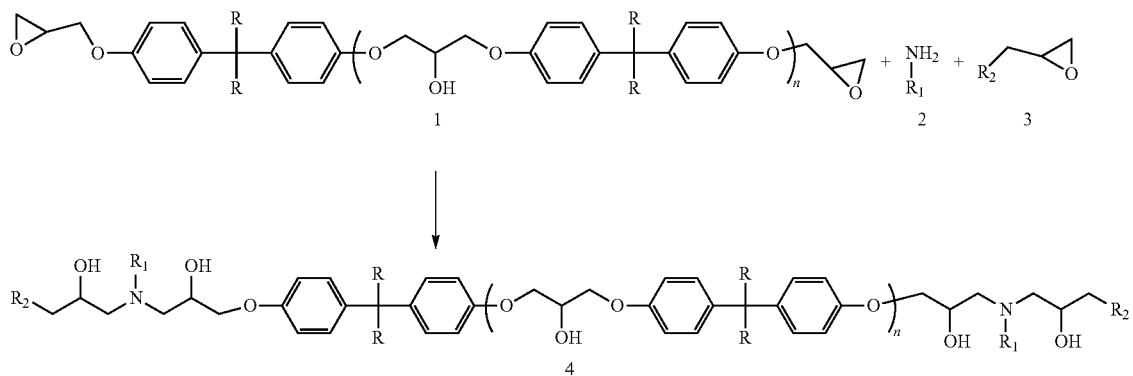

Epoxy Vinyl Ester Linear Polymer

Epoxy vinyl ester is a resin produced by the reaction of an epoxy resin with an unsaturated carboxylic acid and amine curing agents.

In one embodiment, a method is provided for the formation of epoxy vinyl ester linear polymers having a desired molecular weight, made from the reactions between epoxy resins and a curing agent, in the presence of nanoparticulates, followed by the reaction with an unsaturated carboxylic acid, such as acrylic or methacrylic acid and/or other double bond containing acid compounds. Nanoparticulates can be loaded into either the epoxy resin, the curing agent, or both. In addition, nanoparticulates can be added to the reaction mixture along with the carboxylic acid.

In one embodiment, the nanoparticulates are added to the epoxy resin (1). In one embodiment, the epoxy resin is selected from the group consisting of bisphenol A and F resins not limited to diglycidyl ether of bisphenol A and F; modified diglycidyl ether of Bisphenol A and F, cycloaliphatic, 1,4-butanediol diglycidyl ether, 1,6-haxanediol diglycidyl ether (HDGE), neopentyl glycol diglycidyl ether, dimer acid diglycidyl ester, and combinations thereof. Modifiers may also be included, and include Heloxy modifiers, such as Heloxy 8, Heloxy 61, Heloxy 116, Heloxy 62, Heloxy 65, Heloxy 48, Heloxy 67, Heloxy 68, Heloxy 107, Heloxy 71, Heloxy 505, and Cardura E10P.

In one embodiment, the nanoparticulates are added to the curing agent. In one embodiment, the curing agent is a primary amine, and the nanoparticulates are added to a primary amine, i.e., $R_1$—$NH_2$. In one embodiment, curing agents are selected from the group consisting of cyclohexylamine, cyclopentylamine, 2-amino-2-methyl-1,3-propanedio, (±)-3-amino-1,2-propanediol, 2-amino-2-methyl-1-propanol, aniline, substituted anilines, 3-aminopropyltrimethoxysilane, isopropylamine, and combinations thereof. In one embodiment, the curing agent is not limited to amino compounds that favor the formation of linear polymers from epoxy resins, such as primary amines, and include polyether amines, hydroxyl amines, hydroxyl aliphatic amines, hydroxyl aliphatic polyether amine, hydroxy aromatic amines.

In one embodiment, the double bonded compound is selected from the group consisting of substituted methacrylic acid.

The nanoparticulates are added to either the epoxy resin (1) or the curing agent (2). In one embodiment, epoxy linear polymer, containing nanoparticulates, is reacted with methacrylic acid, resulting in epoxy vinyl ester linear polymer (6). In one embodiment, the resultant reaction produces epoxy vinyl ester resin (6) containing nanoparticulates. In various embodiments, nanoparticulates include carbon nanotubes, nanographene, fullerenes, inorganic nanoparticulates including Nanocalys, or a combination thereof. In one embodiment, nanoparticulates are present at about 1% to about 50% in wt % in either reactant or resulting polymer. Use of acrylic acid derivatives such as glycidoxy methacrylic acid and mono-functional epoxy and appropriate curing agent(s) controls the molecular weights of the linear polymers.

foam insulation panels; microcellular foam seals and gaskets; durable elastomeric wheels and tires; automotive suspension bushings; electrical potting compounds; high performance adhesives; surface coatings and surface sealants; synthetic fibers; carpet underlay; hard-plastic parts (e.g., for electronic instruments); and hoses.

The properties of a polyurethane are greatly influenced by the types of isocyanates and polyols used to make it. Long, flexible segments, contributed by the polyol, give soft, elastic polymer. High amounts of crosslinking give tough or rigid polymers. Long chains and low crosslinking give a polymer that is very stretchy, short chains with lots of crosslinks produce a hard polymer while long chains and intermediate crosslinking give a polymer useful for making foam. The choices available for the isocyanates and polyols, in addition to other additives and processing conditions allow polyurethanes to have the very wide range of properties that make them such widely used polymers. The polymerization reaction makes a polymer containing the urethane linkage, —RNHCOOR'— and is catalyzed by tertiary amines, such as 1,4-diazabicyclo[2.2.2]octane (also called DABCO or TEDA), and metallic compounds, such as dibutyltin dilaurate or bismuth octanoate. This is often referred to as the gellation reaction or simply gelling.

In various embodiments, the isocyanates can be aliphatic or aromatic. Aromatic isocyanates, such as diphenylmethane diisocyanate (MDI) or toluene diisocyanate (TDI), are more reactive than aliphatic isocyanates, such as hexamethylene diisocyanate (HDI) or isophorone diisocyanate (IPDI). Most often, the isocyanates are difunctional, that is they have exactly two isocyanate groups per molecule. An important exception to this is polymeric diphenylmethane diisocyanate, which is a mixture of molecules with two-, three-, and four- or more isocyanate groups. In cases like this, the material has an average functionality greater than two, commonly 2.7. Isocyanates with functionality greater than two act as crosslinking sites. Thus, in various embodiments,

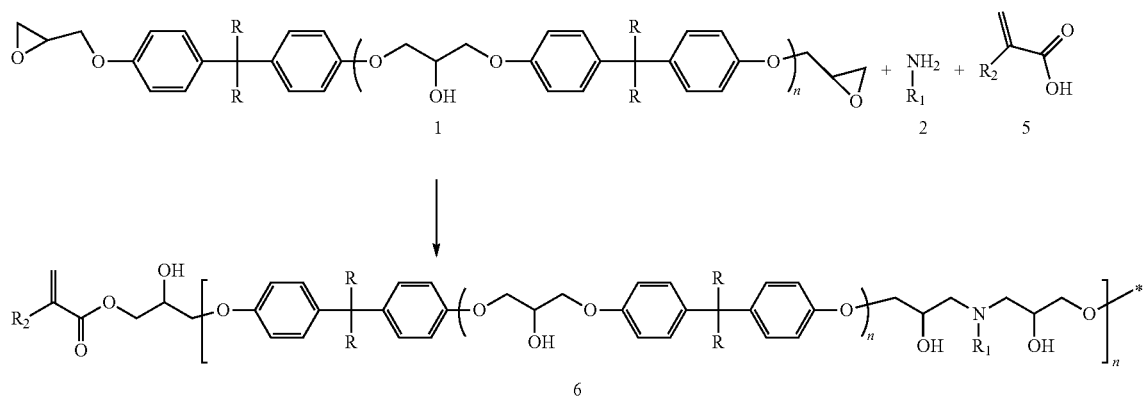

Polyurethane Linear Polymer

Polyurethane is a polymer composed of a chain of organic units joined by carbamate (urethane) links. While most polyurethanes are thermosetting polymers that do not melt when heated, thermoplastic polyurethanes are also available. Polyurethane polymers are formed by reacting an isocyanate with a polyol. In general, both the isocyanates and polyols used to make polyurethanes contain on average two or more functional groups per molecule.

Polyurethanes are generally used in the manufacture of flexible, high-resilience products such as foam seating; rigid the described methods incorporate eactants having a functionality of 2 or less, to maximize linear polymer formation.

Polyols have on average two or more hydroxyl groups per molecule. Polyether polyols are mostly made by polymerizing ethylene oxide and propylene oxide. The polyols used to make polyurethanes are generally not "pure" compounds since they are often mixtures of similar molecules with different molecular weights and mixtures of molecules that contain different numbers of hydroxyl groups, which is why the "average functionality" is often mentioned. The length of the polyol chain and the functionality contributes to the properties of the final polymer. Polyols used to make rigid polyurethanes have molecular weights in the hundreds, while those used to make flexible polyurethanes have molecular weights up to ten thousand or more.

In one embodiment, a method is provided for the formation of polyurethane linear polymers having a desired molecular weight, made from the reaction between isocyanate and polyol, in the presence of nanoparticulates.

Nanoparticulates can be loaded into either the isocyanates, the polyol, or both. In one embodiment, the nanoparticulates are added to the isocyanate (D). In one embodiment, the isocyanate can be either aliphatic, aromatic, or a combination thereof. In one embodiment, the isocyanates is a di-isocyanate, such as methylene diphenyl diisocyanate, touluene diisocyanate, hexamethylene diisocyanate, isophrone diisocyanate etc. In one embodiment, the polyol is a diol (E) and can be either aliphatic, aromatic, or a combination thereof. In one embodiment, the polyol is selected from the group consisting of ethylene glycol, diethylene glycol, triethylene glycol, polyethylene glycol, 1,3-butylene glycol, propylene glycol, 1,4-butylene glycol, polypropylene glycol di(meth)acrylate, 1,6-hexanediol di(meth)acrylate, neopentyl glycol, and combinations thereof.

In one embodiment, the resultant reaction produces polyurethane (F) containing nanoparticulates. In various embodiments, nanoparticulates include carbon nanotubes, nanographene, fullerenes, inorganic nanoparticulates such as Nanocaly, or a combination thereof. In one embodiment, nanoparticulates are present at about 1% to about 50% in wt % in either reactant or resulting polymer. Using a di-functional isocyanates, and suitable polyol, molecular weights of the linear polymers can be controlled.

Poly urethane

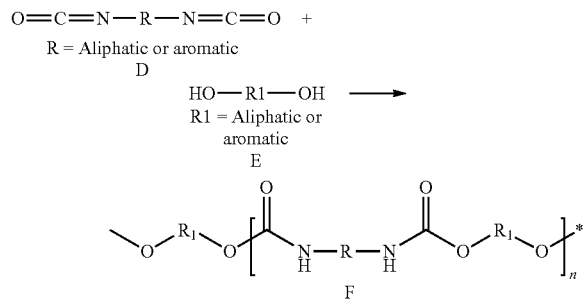

Polyester (I) Linear Polymer

Polyester is a category of polymers which contain an ester functional group in their main chain. Depending on the chemical structure, polyester can be a thermoplastic or thermoset. Thermoset polyesters have double bonds in the acid or alcohol components or both. Synthesis of polyesters is generally achieved by a poly-condensation reaction, and involves the reaction of a diol with a diacid. In some instances, a catalyst is used to make a polymer of high molecular weight, such as antimony trioxide or antimony tri acetate.

Fabrics woven or knitted from polyester thread or yarn are used extensively in apparel and home furnishings. Industrial polyester fibers, yarns and ropes are used in tire reinforcements, fabrics for conveyor belts, safety belts, coated fabrics and plastic reinforcements with high-energy absorption. Polyester fiber is also used as cushioning and insulating material. Polyesters are also used to make a variety of articles including bottles, films, tarpaulin, canoes, liquid crystal displays, holograms, filters, dielectric film for capacitors, film insulation for wire and insulating tapes. Polyesters can also be used as a finish on high-quality wood products such as guitars, pianos and vehicle/yacht interiors. Unsaturated polyesters (UPR) are thermosetting resins. They are often used as casting materials, fiberglass laminating resins and non-metallic auto-body fillers. Fiberglass-reinforced unsaturated polyesters find wide application in bodies of yachts and as body parts of cars.

The composition of the main chain of a polyester can be aliphatic, semi-aromatic, or aromatic. Examples of aliphatic chain polyesters include polyglycolide or polyglycolic acid (PGA) formed by polycondensation of glycolic acid; polylactic acid (PLA) formed by ring-opening polymerization of lactide; polycaprolactone (PCL) formed by ring-opening polymerization of caprolactone; polyethylene adipate (PEA); polyhydroxyalkanoate (PHA); polyhydroxybutyrate (PHB); and poly(3-hydroxybutyrate-co-3-hydroxyvalerate) (PHBV) formed by copolymerization of 3-hydroxybutanoic acid and 3-hydroxypentanoic acid, butyrolactone and valerolactone. Examples of semi-aromatic chain polyesters include polyethylene terephthalate (PET) formed by polycondensation of terephthalic acid with ethylene glycol; polybutylene terephthalate (PBT) formed by polycondensation of terephthalic acid with 1,4-butanediol; polytrimethylene terephthalate (PTT) formed by polycondensation of terephthalic acid with 1,3-propanediol; and polyethylene naphthalate (PEN) formed by polycondensation of at least one naphthalene dicarboxylic acid with ethylene glycol. Examples of aromatic chain polyesters include Vectran formed by polycondensation of 4-hydroxybenzoic acid and 6-hydroxynaphthalene-2-carboxylic acid.

In one embodiment, a method is provided for the formation of polyester linear polymers having a desired molecular weight, made from the reaction between a dicarboxylic acid and a diol, in the presence of nanoparticulates. Nanoparticulates can be loaded into either the dicarboxylic acid, the diol, or both.

In one embodiment, the dicarboxylic acid (G) includes both aliphatic and aromatic compounds, and combination thereof, including sebacic acid, adipic acid, dodecanoic acid, glutaric acid, maleic acid, malonic acid, maleic acid. In one embodiment, the diol (H) includes both aliphatic and aromatic compounds, and combination thereof. In one embodiment, the diol is selected from the group consisting of ethylene glycol, diethylene glycol, triethylene glycol, polyethylene glycol, 1,3-butylene glycol, propylene glycol, 1,4-butylene glycol, polypropylene glycol di(meth)acrylate, 1,6-hexanediol di(meth)acrylate, neopentyl glycol, and combinations thereof.

In one embodiment, the resultant reaction produces polyester (I) containing nanoparticulates. In various embodiments, nanoparticulates include carbon nanotubes, nanographene, fullerenes, inorganic nanoparticulates, or a combination thereof. In one embodiment, nanoparticulates are present at about 1% to about 50% in wt % in either reactant or resulting polymer. Using a mono-functional acid, and suitable alcohol, molecular weights of the linear polymers can be controlled.

Poly ester

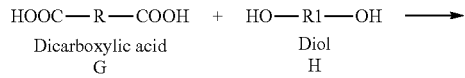

Dicarboxylic acid      Diol
     G                        H

-continued

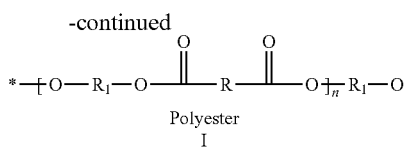

Polyester
I

In various embodiments, nanoparticulates are dispersed into the precursors, for example, epoxy resin, epoxy vinyl ester resin, polyurethane, or polyester precursors, by a variety of methods including sonication, high shear mixing, low shear mixing, and three roll calendaring. In one embodiment, dispersion of the nanoparticulates is achieved in the absence of a dispersing agent. In one embodiment, dispersion of the nanoparticulates is assisting using conjugate polymers, such as poly(phenyleneethynylenes) (PPEs), polythiophene, polyanaline, polypyrroles, and Zyvex Kentera technology, which is based on the non-covalent functionalization of CNTs by pi stacking. For example, in various embodiments, the conjugate polymers associate with the nanomaterials in a non-wrapping fashion, and assist in dispersion of nanoparticulates. As used herein, "non-wrapping" means not enveloping the diameter of the nanomaterial with which a polymer is associated. Thus, associating a polymer with a nanomaterial in a "non-wrapping fashion" encompasses an association of the polymer with the nanomaterial in which the polymer does not completely envelop the diameter of the nanomaterial. In some examples, the non-wrapping fashion may be further defined and/or restricted. For instance, a conjugate polymer can associate with nanoparticulate (e.g., via pi-stacking interaction therewith) wherein the polymers backbone extends substantially along the length of the nanoparticulate without any portion of the backbone extending over more than half of the nanomaterial's diameter in relation to any other portion of the polymers backbone. Side chains, extensions and functional groups attached to the backbone of the conjugate polymers may extend about all or a portion of the diameter of the nanoparticulate, but the backbone of the polymer is sufficiently rigid such that it does not wrap about the diameter of nanoparticulate with which it is associated. The conjugate polymers may be functionalized to contain substituents and/or side chains that further affect dispersion behavior, and enhance adhesion in composites, for example. In various embodiments, the described linear polymers can also be used for functionalizing the nanoparticulate.

The curing agents may be added into the reaction at about 30% to about 100% by weight of resin, calculated by the stoichiometry, where for complete reaction, two reactants are added in equal ratio of their equivalents. In one embodiment, polymerization reactions occur at about 50° C. to about 200° C. In one embodiment, polymerization reactions times are from about 2 minutes to about 5 hours.

In one embodiment, about 1% to about 50% wt % of unfunctionalized or functionalized, CNT was added to a mixture of 80% of epoxy resin and 20% of a modifier, which is mono-functional resin that will prevent the growth of the polymer chain. The mixture was heated to about 40° C. to about 100° C. and curing agent was added dropwise over a period of approximately 2 hours. During the addition of curing agent, the reaction mixture is exothermic and the mixture temperature rises to about 70° C. to about 200° C. more than the reaction temperature. In one embodiment, the ideal reaction temperature is between 70° C. to 200° C. After completing addition of the curing agent, the mixture was stirred for an additional 1-2 hours at 100° C. to 200° C. The resulting linear polymer contains well-dispersed nanoparticulates, and is suitable, for example, for inclusion into a secondary resin composition as a master batch. In one embodiment, the liner polymer master batches have very high concentration of CNTs, that can be let down into other resins, where a small percentage of liner polymer containing the nanoparticulates is typically added to the resin.

The role of the modifier is the promotion of the creation of linear polymers. The bi-functional reactants help in chain propagation. The mono-functional reactants are modifiers and aid in chain termination. In various embodiments, a modifier is present in the reaction and helps in controlling the molecular weights of the linear polymer. Mono-functional reactants also help in improving the shelf life of the linear polymer. In various embodiments, modifiers are added in the range of 10% to 20% by weight. Modifiers can be added at the beginning of the polymerization reaction or at a later stage. In some cases modifiers react at the beginning of the polymerization reaction to assist the linear polymer to grow in one direction. In other cases, the modifiers react towards the end of the polymerization reaction after all the bi-functional reactant is consumed. In some cases, modifiers have multiple functional groups, out of which only one functional group reacts to form the linear polymer. As explained above, the other unreactive groups help in cross-linking of the linear polymer with the bulk polymer matrix help in locking the nanoparticulates into FRP composites.

The present method is also related to the delivery of nanoparticles into fiber reinforced composites fabricated by processes such as VARTM (Vacuum Assisted Resin Transfer Molding), Vacuum infusion line (VI), sheet molding compounding (SMC), Light composite Molding (LCM), bulk molding compound (BMC), pultrusion, filament winding, prepreg and compression molding. In addition, the described method also covers the delivery of nanoparticulates into pre-form binders. The described delivery system comprises the use of a linear polymer derivable from thermoset resins and appropriate curing agents. The linear polymer chain wraps around the nanomaterials to create a uniform coating on the surface of the nanomaterials. The linear polymer not only creates a physical barrier preventing re-agglomeration or re-aggregation of the nanomaterials, but also aids in enhancing the interaction of the nanomaterials with the fiber in the fiber-reinforced composites by compatibilizing the surface energies.

Sheet molding compounds (SMC) are fiber-reinforced thermosetting semi-finished products. They are produced in thin uncured and thickened sheets between 1 and 3 mm thick that can be handled easily. SMC compounds include short, that is, discontinuous, fibers or fiber bundles that are impregnated between two layers of a resin paste. Various types of fibrous reinforcement such as carbon, glass, Kevlar and other natural and man-made fiber bundles may be used, where a strand of individual glass filaments, is most common, but also includes carbon fiber bundles, plant-based fibers, or hybrids. In one embodiment, the typical length of the fiber reinforcement is about 25 mm to about 50 mm. In one embodiment, the volume fraction of the fibrous reinforcement ranges between about 10% and about 65%. In one embodiment, the resin paste, also referred to as the composite matrix, consists of a mixture of a thermosetting resin, fillers such as calcium carbonate, alumina, etc., and additives such as initiators, inhibitors, thickeners, mold release agents, and low profile additives (LPAs). In one embodiment, the thermosetting resin is polyester, vinylester, or epoxy.

Pre-preg is a term for "pre-impregnated" composite fibers where a matrix material, such as epoxy, is already present. The fibers can be either in the form of woven fabrics and unidirectional fiber tows and the matrix is used to bond them together and to other components during manufacture. The thermoset prepreg matrix is formulated with a variety of resins to provide the required properties.

Filament winding is a fabrication technique for manufacturing composite material, usually in the form of cylindrical structures. Continuous, resin-impregnated fibers or roving are wound on a rotating mandrel in a predetermined pattern, providing maximum control over fiber placement and uniformity of structure. The reinforcement is impregnated with resin prior to winding; the fiber picks up the low-viscosity resin either by passing through a trough or from a metered application system.

Pultrusion is a process of making composites of fixed cross section by pulling dry, continuous fibers through a bath of resin followed by extrusion through a required shaped die matching the geometry of the desired profile. Depending on the required strength, a variety of reinforcing materials (roving, mats, fabrics, complexes, non-woven fabrics) may be reeled off coils and rolls and fed into the mould.

Bulk molding compound (BMC) is a thermoset plastic made up of a polymer resin, various inert fillers, fiber reinforcement, catalysts, stabilizers, and pigments that form a viscous, 'playdough like' compound for molding. BMC is highly filled and reinforced with short fibers. In one embodiment, glass reinforcement represents between 5% to 30% by volume, with glass length typically between ⅛" and ½". BMC is often used in making composite parts by compression, transfer and injection molding processes.

Fiber preforms are chopped or woven fiber mats made as an intermediate product in the shape of the part they will be used to reinforce. Chopped fiber preforms are made from short fiber tow or bundle by depositing them onto a screen through which vacuum is being pulled. The screen is in the shape of the part desired and the vacuum holds the chopped fibers in place. Applied with the chopped fibers is a binder that will hold the fibers together. In one embodiment, in making woven fabric performs, solid powder or liquids called preform binders are sprayed on the layers of fabrics in the shape of the part. Once the binder has been processed either with heat or light depending on the type of binder, preforms are ready to be used with conventional VARTM or resin infusion processes. The binders play an important role in determining the preform's properties, affecting its strength, stiffness, loft and permeability. Compatibility of the binder to molding resin may also impact a part's surface appearance and coupling of the resin to fibers.

Light Composite Molding (LCM) uses a variety of preformed fiber reinforcements that are positively placed in the mold exactly where they need to be in the final molded part. A measured charge of liquid resin paste is placed on a portion of the reinforcement and a controlled closure of the press flows the paste throughout the stationary reinforcement to fill the mold.

Vacuum infusion (VI) is a process widely used for the manufacture of large composite structures. VI involves a stiff mould half and the flexible mould half. VI is a part of a family of molding techniques called liquid composite molding, in which resins are pulled into the mould by negative pressure, and the resin impregnates the fibers/fabrics already laid out in the mould. VI involves infusion of low viscosity resin into a dry fibrous preform placed on a stiff mould and covered by a flexible membrane. Vacuum infusion is known under different acronyms, all describing methods based on the impregnation of a dry reinforcement by liquid thermoset resin driven under vacuum, and includes VARTM (Vacuum Assisted Resin Transfer molding), SCRIMP (Seemann Composites Resin Infusion Molding Process), VBRTM (Vacuum Bag resin Transfer Molding), VARI (Vacuum Assisted Resin Injection Process) and RIFT (Resin Injection under flexible tooling). Despite superior properties of resins reinforced with nanoparticles, they have not resulted in VI applications. The smaller spaces between the fiber reinforcements when compared to at least one dimension of the nano-particulates have imposed great technological challenges. In the process of pushing resin through the fibers, the close spaces in the fibers act as filtration media and filter out the nanoparticulates. As a result, the nanoparticulates tend to concentrate only in certain parts of the composite, creating stress concentration points and premature failure of the composites.

The described linear polymer delivery system (LPDS) helps to de-bundling and dispersing the nanoparticulates into the resins used, for example, in VI. The singulated state of the nanoparticulate is much smaller than the gaps of the fiber reinforcement and therefore, is not filtered out. Furthermore, the LPDS can be used with a variety of composite manufacturing process such as SMC, BMC, Prepreg, pultrusion, LCM and others. In general, the liner polymers function as nanoparticulate carriers and facilitate the distribution of the nanoparticulate into other compatible thermoset and thermoplastic resins. By compatible, it is understood in the art that where the chemical structure of the linear polymers is similar to that of the thermoset or thermoplastic. LPDS are designed to be compatible with the formulations based on epoxy resins, epoxy vinyl ester, polyurethane, polyester or their combinations. Depending on the composite manufacturing process, the linear polymer delivery system is compatible with both man made fibers and natural fibers.

In one embodiment, the linear polymer with nanoparticulates can be blended into resins for making prepregs, filament winding, pultrusion, filament winding, sheet molding compound (SMC), buck molding (BMC), compression molding and injection molding. In addition, a solid linear polymer can be extruded by melt spinning process into 10-20µ continuous fiber filaments that can be further converted into non-woven fabrics (NWF). For making the FRPs, the NWF are interlaced between the reinforcement components such as glass or carbon fabrics and then neat resin with appropriate curing agents is infused through the composite layup. During the infusion and curing process, the NWF dissolves in the resin and distributes the nanoparticulates uniformly between various plys of the composites. The melting points (flowing points) of fibers or tows can be adjusted by formulating the resins. The fiber form or non-woven fabric can be used for large composite structural component manufacturing, such as wind blade and boat without filtration of nanoparticulates. Depending on the chemical nature, the linear polymer could have either solid or liquid physical states. The linear polymer helps in both delivering the nanoparticulates into polymer composites and in creating a singulated state. The solid or liquid form of linear polymer can be blended readily into the resin systems used in various composite-fabricating processes.

A comparison of the properties of composites with and without liner polymer nanoparticulate delivery system is presented in Tables 1 through 6. Glass and carbon fiber laminates were prepared using resins such as Epoxy, vinyl ester, polyester and their combinations. Various composite manufacturing methods such as SMC, filament winding, LCM, VI and prepregs were used in making the composites.

The nanoparticulate linear polymer delivery system in the tables below is indicated as Zyvex additive; control refers to the composite without the additive, where the nanoparticulate in Tables 2 and 6 was a combination of nanoclay and functionalized CNTs, and the nanoparticulate in Tables 1 and 3-8 was functionalized CNTs.

The new linear polymer systems disclosed in the patent appears to provide the required mechanical property improvements.

TABLE 1

Performance of Carbon Fiber Epoxy Laminates Fabricated by Vacuum Infusion

| | Units | Control | With Zyvex Additive | Percentage Improvement |
|---|---|---|---|---|
| Modulus | (PSI) | 6,430,993 | 7,191,454 | 11.8% |
| Stress | (PSI) | 61,430 | 94,802 | 54.3% |
| Strain | (PSI) | 0.0100 | 0.0140 | 36.0% |

TABLE 2

Mechanical Performance of Glass Fiber Polyester/Vinyl Ester Laminates Fabricated by SMC

| Notched Izod | Units | Control | With Zyvex Additive | Percentage Improvement |
|---|---|---|---|---|
| Energy to Break | J | 1.97 | 2.4 | 20.9% |
| Impact Resistance | J/m^2 | 61469 | 74136.9 | 20.6% |
| Impact Resistance | J/m | 621 | 749.6 | 20.6% |
| Impact Resistance | ft*lbf/in | 11.62 | 14 | 20.6% |

TABLE 3

Mechanical Performance of Chopped Glass Fiber Polyester Laminates Fabricated by Liquid Composite Molding (LCM)

| Property Test | ASTM | Units | CONTROL | With Zyvex additive | Percentage Improvement |
|---|---|---|---|---|---|
| Tensile Strength | D-638 | MPa | 76 | 81 | 6.6% |
| Tensile Modulus | D-638 | MPa | 6778 | 7235 | 6.7% |
| Flexural Strength | D-790 | MPa | 118 | 136 | 15.3% |
| Flexural Modulus | D-790 | | | | |
| 0.5 mm | | MPa | 6136 | 6717 | 9.5% |
| 2.5 mm | | MPa | 5832 | 6431 | 10.3% |
| Unnotched Izod Impact | D-4812 | kJ/m2 | 61.6 | 66.8 | 8.4% |

TABLE 4

Mechanical performance data of Chopped carbon Fiber polyester laminates fabricated by Liquid Composite Molding (LCM)

| Property Test | ASTM | Units | CONTROL | With Zyvex additive | Percentage Improvement |
|---|---|---|---|---|---|
| Tensile Strength | D-638 | MPa | 88 | 115 | 31% |
| Tensile Modulus | D-638 | MPa | 13962 | 15319 | 10% |
| Flexural Strength | D-790 | MPa | 155 | 169 | 9% |
| Flexural Modulus | D-790 | | | | |
| 0.5 mm | | MPa | 12407 | 14466 | 17% |
| 0.25 mm | | MPa | 10665 | 12898 | 21% |
| Unnotched Izod Impact | D-4812 | kJ/m2 | 28.2 | 31.9 | 13% |

TABLE 5

Mechanical Performance of Glass Fiber Epoxy Laminates Fabricated by Filament Winding

| Flexural Fatigue | Units | Control | With Zyvex additive | % Improvement |
|---|---|---|---|---|
| Run 1 | Cycles | 52,030 | 750,000 | 1,341 |
| Run 2 | Cycles | 70,599 | 1,000,000 | 1,316 |
| Run 3 | Cycles | 272,509 | 499,160 | 83 |
| Average | Cycles | 131,713 | 749,720 | 469% |

TABLE 6

Mechanical Performance of Glass Fiber Polyester/Vinyl Ester Laminates Fabricated by SMC

| Tensile Property | Units | Control Avg in two directions | With Zyvex Additive | % Improvement |
|---|---|---|---|---|
| Peak Stress | Ksi | 12.9 | 14.7 | 13.6% |
| Peak Stress | Mpa | 87.9 | 99.9 | 13.6% |
| Modulus | Ksi | 1191 | 1290 | 8.3% |
| Modulus | Mpa | 8098.8 | 8772 | 8.3% |
| Peak Load | lbf | 814.5 | 895.9 | 10.0% |

TABLE 7

Mechanical Performance (flexural properties) of Glass Fiber Epoxy resin Laminates Fabricated by hand lay-up

| | Flexural Modulus | % improvement | Flexural stress | % improvement | Flexural strain | % improvement |
|---|---|---|---|---|---|---|
| Epon 828 and Lindride 62 Control | 1442701 | | 25448 | | 0.0094796 | |
| Epon 828 and Lindride 62 with 15% Linear polymer with CNTs | 1839500 | 27.5 | 35766 | 40.5 | 0.0118233 | 24.7 |

TABLE 8

Mechanical Performance (Fracture Toughness) of Glass
Fiber Epoxy resin Laminates Fabricated by hand lay-up

|  | GIIc | % improvement |
|---|---|---|
| Epon 828 and Lindride 62 Control | 837.71 | |
| Epon 828 and Lindride 62 with 15% Linear polymer with CNTs | 1043.79 | 24.60 |

In various embodiments, the above described compositions comprising linear polymers and entrapped nanoparticulates are added to secondary resin system. In various embodiments, the secondary resin system is compatible with the linear polymer, as known in the art.

The following references relate to various aspects of the method and composition, each of which is incorporated by reference herein in its entirety:

1. Nitroxide Spin Probe/Label Study of Hydrogen Bonding and Probe Size Effects in a Linear Epoxy Polymer, Macromolecules 1995, 28, 5300-5305
2, 3. Dielectric Spectroscopy and Calorimetry during Post-curing of a Linear Chain Polymer Thermoset Formed from a Diepoxide and Cyclohexylamine, and the Nature of the Products, Journal of Polymer Science: Part B: Polymer Physics, Vol. 36, 303-318 (1998)
4. Helical microtubules of graphitic carbon, Nature 1991, 354, 56-58. (b) Saito, R.
5. Physical Properties of Carbon Nanotubes, Imperial College Press, London, 1998.
6. Carbon nanotubes, buckyballs, ropes, and a universal graphitic potential, Physical Review B, 2000, 62, 13104-13110.
7. Noncovalent Engineering of Carbon Nanotube Surfaces by Rigid, Functional Conjugated Polymers, J. Am. Chem. Soc. 2002, 124, 9034-9035.
8. Synthesis of aryl- and vinyl-substituted acetylene derivatives by the use of nickel and palladium complexes, J. Organomet. Chem. 1975, 93, 253-257.
9. Linear Monodisperse π-Conjugated Oligomers: Model Compounds for Polymers and More, Angew. Chem. Int. Ed. 1999, 38, 1350-1377.
10. Poly(p-phenyleneethynylene)s Are Thermotropic Liquid Crystalline" Macromolecules 1999, 32, 4460-4463.
11. Synthesis and physical properties of novel side-chain type liquid crystalline poly(aryleneethynylene)s, Macromol. Chem. Phys. 1998, 199, 977-983.
12. Palladium catalyzed synthesis of aryl, heterocyclic and vinylic acetylene derivatives, J. Organomet. Chem. 1975, 93, 259-263.
13. Synthesis of aryl- and vinyl-substituted acetylene derivatives by the use of nickel and palladium complexes, J. Organomet. Chem. 1975, 93, 253-257.
14. Linear Monodisperse π-Conjugated Oligomers: Model Compounds for Polymers and More, Angew. Chem. Int. Ed. 1999, 38, 1350-1377.
15. Synthesis of α,ω-Difunctionalized Oligo- and Poly(p-phenyleneethynylene)s, Macromolecules 1998, 31, 2447-2453.
16. (Poly(p-phenyleneethynylene)s Are Thermotropic Liquid Crystalline, Macromolecules 1999, 32, 4460-4463.
17. Polymer and Method for using the polymer for Non-covalently functionalizing Nanotubes, U.S. Pat. No. 7,547,472 B2
18. Nanocomposite comprising exfoliated nanoclay-styrenic concentrate and methods of preparation, U.S. Pat. No. 7,928,156 B2
19 Nanocarbon-reinforced polymer composite and method of making, U.S. Pat. No. 8,048,341 B2.

We claim:

1. A method for uniformly dispersing a carbon nanoparticulate within a resin, the method comprising
    adding the carbon nanoparticulate to at least one of a monomeric first polymer precursor or reactant;
    combining the first polymer precursor or reactant containing the carbon nanoparticulate with at least a monomeric second polymer precursor or reactant, and
    subjecting the combination to conditions sufficient to initiate polymerization and production of a substantially linear polymer, such that the carbon nanoparticulate is entrapped within the resulting substantially linear polymer, to result in a master batch, and mixing the master batch with the resin, such that uniform dispersion of the carbon nanoparticulates is achieved.

2. The method of claim 1 wherein the substantially linear polymer is at least one of an epoxy resin, an epoxy vinyl ester, a polyurethane, or a polyester.

3. The method of claim 1 further comprising the addition of a modifier at any time point, wherein the modifier terminates the polymerization reaction.

4. The method of claim 1 wherein the addition of the carbon nanoparticulate further comprises the use of conjugate polymers selected from the group consisting of polyphenylene ethynylenes (PPEs), polythiophene, polyanaline, polypyrroles, and combinations thereof.

5. The method of claim 1 wherein at least one of the monomeric first polymer precursor or reactant or monomeric second polymer precursor or reactant is a curing agent, and the curing agent is added into the reaction at 30% to 100% by weight of the curing agent calculated by the stoichiometry.

6. A composition comprising a substantially linear polymer and a carbon nanoparticulate, wherein the substantially linear polymer was formed from at least a monomeric first polymer precursor or reactant and a monomeric second polymer precursor or reactant in the presence of the carbon nanoparticulate.

7. The composition of claim 6 wherein the composition is a master batch.

8. The composition of claim 6, wherein the substantially linear polymer is made from:
    a) reaction between epoxy monomer(s) and curing agents in the presence of carbon nanoparticulates;
    b) reaction between epoxy monomer(s) and curing agents, in the presence of carbon nanoparticulates, followed by reaction with acrylic/methacrylic acid and/or a double bond containing acid compounds;
    c) reaction between isocyanate monomer(s) and polyol curing agents, in the presence of carbon nanoparticulates; or
    d) reaction between di-carboxylic acid monomer(s) and diol curing agents, in the presence of carbon nanoparticulates.

9. The composition of claim 8 wherein in a),
    the epoxy monomer(s) are selected from bisphenol A and F not limited to diglycidyl ether of bisphenol A and F; modified diglycidyl ether of Bisphenol A and F, cycloaliphatic, 1,4-butanediol diglycidyl ether, HDGE, neopentyl glycol diglycidyl ether, and dimmer acid diglycidyl ester, Heloxy modifiers selected from the group consisting of Heloxy 8, Heloxy 61, Heloxy 116, Heloxy 62, Heloxy 65, Heloxy 48, Heloxy 67, Heloxy 68, Heloxy 107, Heloxy 71 and Heloxy 505, and Cardura E10P; and the curing agents are selected from primary amino compounds, cyclohexylamine, cyclopentylamine, 2-Amino-2-methyl-1,3-propanedio, (±)-3-Amino-1,2-propanediol, 2-Amino-2-methyl-1-propanol, aniline, substituted anilines, 3-aminopropyltrimethoxysilane, Isopropylamine, and poly ether amine.

10. The composition of claim 6 wherein the carbon nanoparticulates are selected from carbon nanotubes, nanographene, fullerenes, or a combination thereof, from 1% to 50% in wt %.

11. The composition of claim 8 wherein in c),
the isocyanate is a di-isocyanate and/or the isocyanate is aromatic, aliphatic, or a combination thereof; and
the polyol curing agent is an aliphatic diol, aromatic diol, or a combination diol, and is selected from ethylene glycol, diethylene glycol, triethylene glycol, polyethylene glycol, 1,3-butylene glycol, propylene glycol, 1,4-butylene glycol, polypropylene glycol di(meth)acrylate, 1,6-hexanediol di(meth)acrylate, and/or neopentyl glycol.

12. The composition of claim 8 wherein in d),
the di-carboxylic acid is aliphatic, aromatic, and combinations thereof; and
the diol curing agents are aliphatic, aromatic, and combinations thereof, and selected from ethylene glycol, diethylene glycol, triethylene glycol, polyethylene glycol, 1,3-butylene glycol, propylene glycol, 1,4-butylene glycol, polypropylene glycol di(meth)acrylate, 1,6-hexanediol di(meth)acrylate, and/or neopentyl glycol.

13. The method of claim 1 wherein the resin is a fiber reinforced polymer composite, and the carbon nanoparticulate is in a range from 1% to 50% v/v, and wherein the fiber is selected from the group consisting of carbon, glass, Kevlar, natural, man-made, and combinations thereof, and wherein fiber comprises between 10% v/v and 65% v/v of the fiber reinforced polymer composite comprising carbon nanoparticulates.

14. The method of claim 13 wherein the carbon nanoparticulates are both functionalized and unfunctionalized.

15. The method of claim 13 wherein the fiber reinforced polymer composite comprises fiber preforms which are chopped or woven fiber mats.

16. The method of claim 3 wherein the modifier is mono-functional and favors the production of a linear polymer.

* * * * *